US007825772B2

(12) United States Patent
Moritani

(10) Patent No.: US 7,825,772 B2
(45) Date of Patent: Nov. 2, 2010

(54) PORTABLE ELECTRONIC APPARATUS AND COMMUNICATION CONTROL METHOD

(75) Inventor: Mitsuaki Moritani, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/465,530

(22) Filed: May 13, 2009

(65) Prior Publication Data

US 2010/0019884 A1 Jan. 28, 2010

(30) Foreign Application Priority Data

Jul. 24, 2008 (JP) ............................ 2008-191023

(51) Int. Cl.
*H04B 7/00* (2006.01)

(52) U.S. Cl. .................................... 340/10.1; 455/41.1

(58) Field of Classification Search ................ 340/10.1; 455/41.1, 41.2, 269, 575.1, 575.5, 575.7, 455/575.8, 90.3, 128, 349, 351; 361/679.09, 361/679.26, 679.3, 679.55, 679.56, 814, 361/816, 818; 343/702, 872, 873; 348/211.2
See application file for complete search history.

(56) References Cited

U.S. PATENT DOCUMENTS

| | | | | |
|---|---|---|---|---|
| 2005/0117752 | A1* | 6/2005 | Ilma et al. | 380/270 |
| 2006/0159158 | A1* | 7/2006 | Moore et al. | 375/130 |
| 2007/0175277 | A1 | 8/2007 | Ito | |

FOREIGN PATENT DOCUMENTS

| | | |
|---|---|---|
| JP | 2004-199470 | 7/2004 |
| JP | 2007-081506 | 3/2007 |
| JP | 2008-035033 | 2/2008 |
| JP | 2008-098893 | 4/2008 |

* cited by examiner

*Primary Examiner*—Edwin C. Holloway, III
(74) *Attorney, Agent, or Firm*—Knobbe Martens Olson & Bear LLP

(57) ABSTRACT

According to one embodiment, a portable electronic apparatus includes a housing having a first surface, an antenna provided in the housing, and a close proximity wireless transfer device provided in the housing and configured to execute, via the first surface, close proximity wireless transfer with an external device which is present within a predetermined wireless communication-capable distance from the antenna. The antenna is provided on an inner side in the first surface, with a space greater than the wireless communication-capable distance being provided from an outer peripheral edge of the first surface.

8 Claims, 4 Drawing Sheets

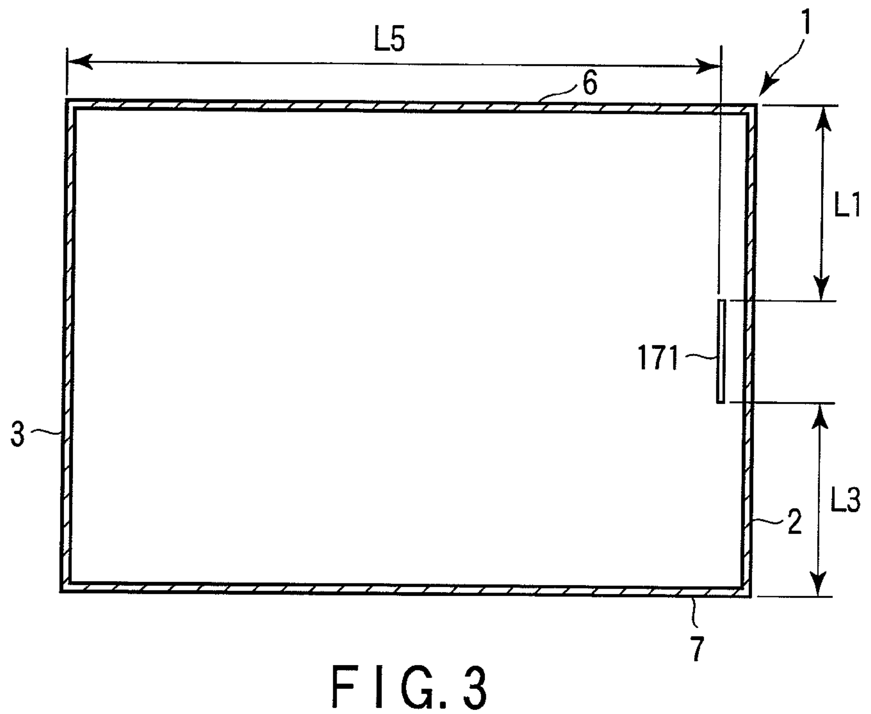
FIG. 3
FIG. 4
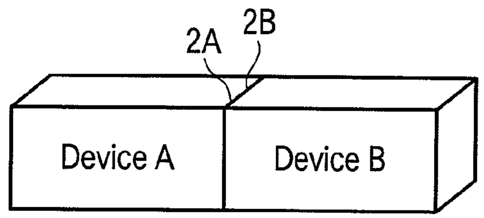
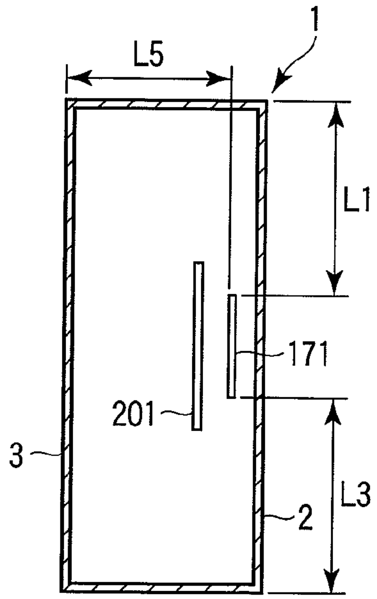
FIG. 5

PORTABLE ELECTRONIC APPARATUS AND COMMUNICATION CONTROL METHOD

CROSS-REFERENCE TO RELATED APPLICATIONS

This application is based upon and claims the benefit of priority from Japanese Patent Application No. 2008-191023, filed Jul. 24, 2008, the entire contents of which are incorporated herein by reference.

BACKGROUND

1. Field

One embodiment of the invention relates to a portable electronic apparatus which executes close proximity wireless transfer, and a communication control method which is applied to the portable electronic apparatus.

2. Description of the Related Art

In recent years, in various kinds of IC cards and mobile phones, non-contact wireless communication has begun to be used. A user can easily execute communication for an authentication process, accounting, etc., simply by performing such an operation as holding the IC card or mobile phone over a reader/writer module of a host apparatus.

Jpn. Pat. Appln. KOKAI Publication No. 2007-81506 discloses a relay apparatus having a wireless communication function. In this relay apparatus, as the wireless communication method, use is made of a communication method having a communication-capable distance of within 10 cm.

Recently, a new close proximity wireless transfer technology, which enables communication at higher speed, has begun to be developed. Such a new close proximity wireless transfer technology is applicable not only to the authentication and accounting, but also to the exchange of data files, such as text data, image data and audio data, between electronic apparatuses.

The time that is needed for wireless communication for authentication process services, etc. is only a moment (e.g. several seconds at most). However, in the case of transferring a data file by close proximity wireless transfer, the time that is needed for wireless communication becomes relatively long. For example, depending on the data size of a data file, a communication time of several minutes may be needed for the transfer of the data file.

As the communication time becomes longer, such a danger becomes more highly possible that a data file in communication leaks to the outside, or a data file is unlawfully hacked by a third party with malicious intent.

It is necessary, therefore, to realize a novel technique which can execute close proximity wireless transfer in a secure environment, without deteriorating operability.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary cross-sectional view showing an example of the cross-sectional structure of the portable electronic apparatus according to the embodiment;

FIG. 4 is an exemplary view for explaining the communication between two devices, each of which is realized by the portable electronic apparatus according to the embodiment;

FIG. 5 is an exemplary cross-sectional view showing another example of the cross-sectional structure of the portable electronic apparatus according to the embodiment;

DETAILED DESCRIPTION

Various embodiments according to the invention will be described hereinafter with reference to the accompanying drawings. In general, according to one embodiment of the invention, there is provided a portable electronic apparatus comprising: a housing having a first surface; an antenna provided in the housing, opposed to the first surface, and configured to output a wireless signal to outside via the first surface; and a close proximity wireless transfer device provided in the housing, and configured to execute, via the first surface, close proximity wireless transfer with an external device which is present within a predetermined wireless communication-capable distance from the antenna, wherein the antenna is provided on an inner side in the first surface, with a space greater than the wireless communication-capable distance being provided from an outer peripheral edge of the first surface.

Figure 1:
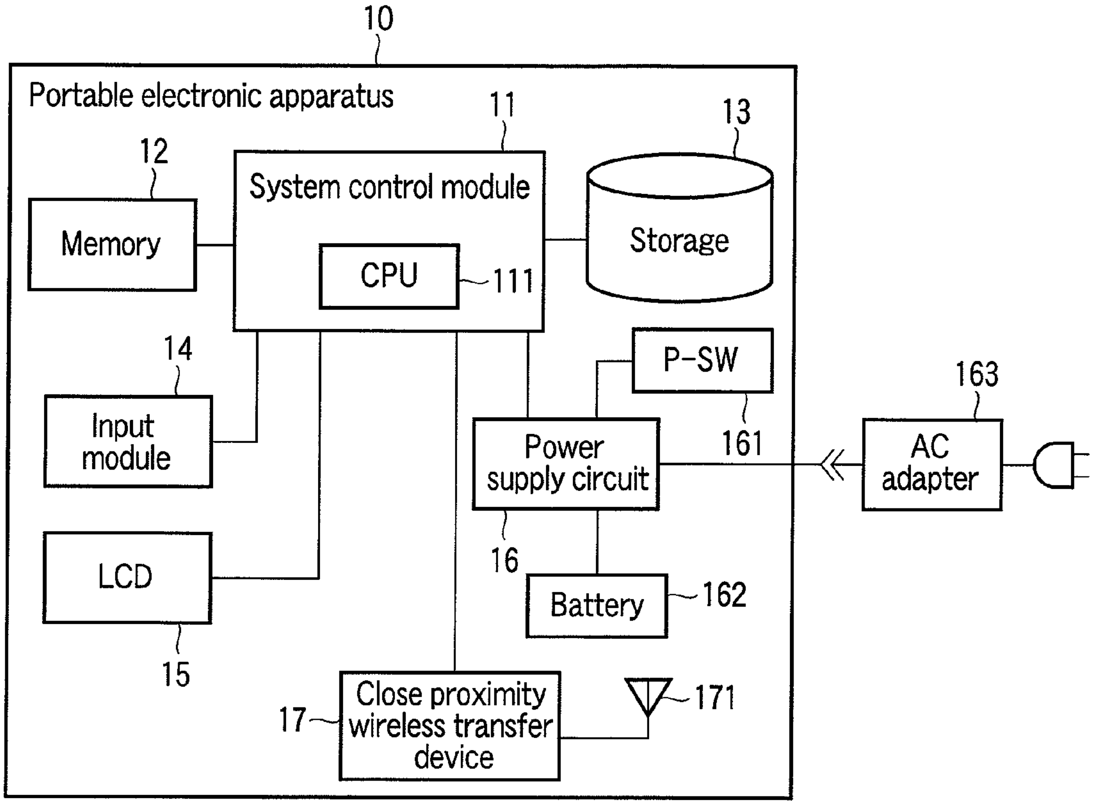
FIG. 1 is an exemplary block diagram showing a structure example of a portable electronic apparatus according to an embodiment of the invention.

FIG. 1 shows the structure of a portable electronic apparatus according to an embodiment of the invention.

The portable electronic apparatus 10 is realized as a portable information terminal such as a PDA, an audio/video player or a personal computer. The portable electronic apparatus 10 includes a system control module 11, a memory 12, a storage 13, an input module 14, a liquid crystal display (LCD) 15, a power supply circuit 16, and a close proximity wireless transfer device 17.

The system control module 11 controls the operations of the respective components in the portable electronic apparatus 10. The system control module 10 is connected to the memory 12, storage device 13, input module 14, LCD 15, power supply circuit 16 and close proximity wireless transfer device 17. The system control module 10 includes a CPU 111.

The CPU 111 executes an operating system and various application programs, which are loaded from the storage device 13 into the memory 12. The application programs include a communication control program which executes data transfer by using the close proximity wireless transfer device 17, and a driver program which controls the close proximity wireless transfer device 17.

The storage device 13 is composed of, e.g. a hard disk drive or a nonvolatile semiconductor memory. The input module 14 is an input device for inputting data and instructions, which are to be delivered to the CPU 111. The input module 14 is realized by, for instance, a plurality of button switches, or a pointing device.

The LCD 15 is a display device which is used as a display monitor of the portable electronic apparatus 10. The power supply circuit 16 supplies power to the respective components in the portable electronic apparatus 10 by using power that is supplied from the outside via an AC adapter 163, or power that is supplied from a battery 162 provided in the portable electronic apparatus 10. In other words, the portable electronic apparatus 10 is driven by an external power supply such as an AC commercial power supply, or by the battery 162. The AC adapter 163 may be provided in the portable electronic apparatus 10. In accordance with an operation of a power switch (P-SW) 161 by the user, the power supply circuit 16 powers on or off the portable electronic apparatus 10.

The close proximity wireless transfer device 17 executes close proximity wireless transfer. The close proximity wireless transfer is a kind of NFC (Near Field Communication). The close proximity wireless transfer between the close proximity wireless transfer device 17 and another close proximity wireless transfer device (external device) is executed in a peer-to-peer form. The communicable distance is, e.g. 3 cm. The close proximity wireless transfer between the close proximity wireless transfer device 17 and another close proximity wireless transfer device is enabled only when the distance therebetween becomes within the communication-capable distance (e.g. 3 cm). If the close proximity wireless transfer device 17 and another close proximity wireless transfer device approach each other within the communication-capable distance, connection is established between these devices. Thus, data transfer of a data file, which is explicitly designated by the user, or a predetermined data file, which is to be synchronized, is executed between the close proximity wireless transfer device 17 and said another close proximity wireless transfer device.

In the close proximity wireless transfer, an induction electric field is used. As a close proximity wireless transfer method, for example, Transfer JET is usable. Transfer JET is a close proximity wireless transfer method which makes use of UWB, and which can realize high-speed data transfer.

The close proximity wireless transfer device 17 is connected to an antenna 171. The antenna 171 executes transmission/reception of data to/from the external device by a wireless signal using an induction electric field. The close proximity wireless transfer device 17 and the antenna 171 can be realized as a single module.

Figure 2:
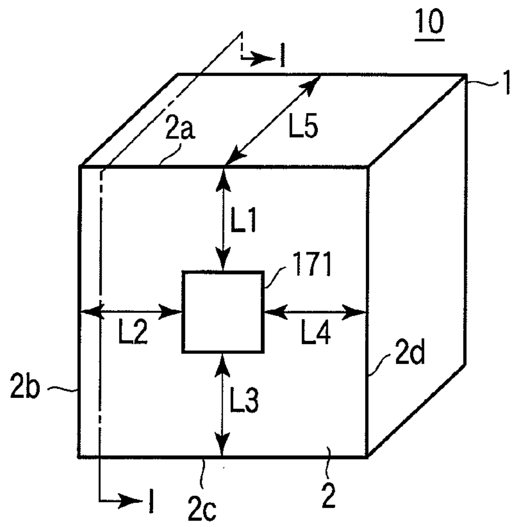
FIG. 2 is an exemplary perspective view which schematically shows the external appearance of the portable electronic apparatus according to the embodiment.

FIG. 2 is a perspective view which schematically shows the external appearance of the portable electronic apparatus 10 according to the embodiment.

The portable electronic apparatus 10 includes a housing 1 which accommodates the components of the portable electronic apparatus 10. In the housing 1, there are provided the system control module 11, memory 12, storage 13, input module 14, liquid crystal display (LCD) 15, power supply circuit 16, and close proximity wireless transfer device 17, which are shown in FIG. 1.

The housing 1 has a first surface 2. The antenna 171 of the close proximity wireless transfer device 17 is provided in the housing 1 such that the antenna 171 is opposed to the first surface 2. The antenna 171 is so disposed as to output a wireless signal (induction electric field) to the outside via the first surface 2. The close proximity wireless transfer device 17 executes via the first surface 2 the close proximity wireless transfer with an external device which is present within a predetermined wireless communication-capable range (e.g. 3 cm) from the antenna 171. The first surface 2 functions as a communication surface which is used for the close proximity wireless transfer between the portable electronic apparatus 10 and the external device. The user can start data transfer between the external device and the portable electronic apparatus 10 by positioning the communication surface of the external device in close proximity to the first surface 2 of the portable electronic apparatus 10, or by positioning the first surface 2 of the portable electronic apparatus 10 in close proximity to the communication surface of the external device.

In the present embodiment, in order to prevent the wireless signal from being radiated to the outside of the housing 1 via surfaces other than the first surface 2, the antenna 171 is provided on an inner side of the first surface 2 with a space, which is greater than the wireless communication-capable distance (3 cm), being provided from the outer peripheral edges of the first surface 2. The antenna 171 is spaced apart, by a distance greater than 3 cm, from each of an upper end 2*a*, a left end 2*b*, a lower end 2*c* and a right end 2*d* of the first surface 2. Each of distances L1, L2, L3 and L4 is greater than 3 cm. The distance L1 designates a distance between the upper end 2*a* and the antenna 171. Similarly, the distance L2 designates a distance between the left end 2*b* and the antenna 171, the distance L3 designates a distance between the lower end 2*c* and the antenna 171, and the distance L4 designates a distance between the right end 2*d* and the antenna 171. In this manner, in the present embodiment, the shortest distance between the outer peripheral edges of the surface 2 and the antenna 171 is set to be greater than 3 cm.

In addition, a distance L5 may be set to be greater than 3 cm. This distance L5 designates a distance between the surface, which is opposed to the first surface 2, and the antenna 171.

FIG. 3 shows an example of the cross-sectional structure of the housing 1, which is taken along line I-I in FIG. 2.

In FIG. 3, the surface, which is opposed to the surface 2 with a predetermined space, is depicted as a surface 3. The top surface of the housing 1 is a surface 6, and the bottom surface of the housing 1 is a surface 7.

For example, the surface 2 can function as one side wall of the housing 1, and the surface 3 can function as another side wall of the housing 1. The surface 6 can function as a top wall of the housing 1, and the surface 7 can function as a bottom wall of the housing 1. The antenna 171 is opposed to the surface 2 in the state in which the antenna 171 is in a close proximity to the surface 2. The antenna 171 is disposed at a position where the distance from the surface 6 is L1, the distance from the surface 7 is L3, and the distance from the surface 3 is L5. As described above, each of the distances L1, L3 and L5 is greater than the wireless communication-capable distance that is the distance over which the antenna 171 of the close proximity wireless transfer device 17 can execute close proximity wireless transfer with another close proximity wireless transfer device.

Although the close proximity wireless transfer device 17 is not depicted in FIG. 3, the close proximity wireless transfer device 17 is disposed near the antenna 171. In the case where the close proximity wireless transfer device 17 and the antenna 171 are realized as a single module, the position of the close proximity wireless transfer device 17 is the same as the position of the antenna 171.

FIG. 4 shows the state in which the communication surfaces of two portable electronic apparatuses are positioned in close proximity.

Each of devices A and B in FIG. 4 has the same structure as the portable electronic apparatus of the present embodiment.

Wireless communication between the device A and device B is executed in the state in which a communication surface 2A of the device A and a communication surface 2B of the device B are positioned in close proximity, as shown in FIG. 4. The communication surface 2A of the device A and the communication surface 2B of the device B have, for example, the same size. In each of the device A and device B, the antenna is disposed at an adequately remote position from the end portions of the communication surface. Thus, during the period in which wireless communication of the close proximity wireless transfer method is executed between the device A and device B, a wireless signal of the wireless communication never reaches a device other than the devices A and B. Even if a third party with malicious intent places some other close proximity wireless transfer device in the proximity of the devices A and B during the data transfer between the devices A and B, the third party cannot steal the transfer data. Therefore, the close proximity wireless transfer between the devices A and B can be executed in a very secure environment.

The communication surface 2A and communication surface 2B may not necessarily have the same size. In the communication surface of each of the devices A and B, the space that is greater than the communication-capable distance is provided between the antenna and the end portion of the communication surface. Thus, even in the case where the communication surface of one of the device A and device B is smaller than the communication surface of the other, if the antenna of one of the devices A and B and the antenna of the other device are in close proximity, that is, if communication between the devices A and B can be executed, the wireless signal for data transfer between the devices A and B never leaks to the outside.

By this secure close proximity wireless transfer, the leak of data can be prevented without implementing data protection in a protocol level, such as encryption. Since the software (communication control program, driver program) which runs on the portable electronic apparatus 10 of the present embodiment does not execute encryption of data that is to be transferred, the close proximity wireless transfer device 17 transmits the data, which is composed of plaintext, to the external device.

A description is given of the procedure of the close proximity wireless transfer which is executed between the devices A and B.

The close proximity wireless transfer between the devices A and B is executed, for example, in the state in which the communication surface 2A of the device A and the communication surface 2B of the device B are positioned in close proximity, to be more specific, in the state in which the communication surface 2A and communication surface 2B are put in contact. One of the devices A and B transmits a connection request signal. The other of the devices A and B executes, at predetermined time intervals, a process of detecting the connection request signal. When the other device detects the connection request signal from said one device, the connection between the devices A and B can be established.

FIG. 5 shows another example of the cross-sectional structure of the housing 1.

FIG. 5 assumes the case in which the distance L5 between the antenna 171 and the surface 3 is not greater than the wireless communication-capable distance. Depending on the shape and size of the housing 1, there may be a case in which the space between the surface 2, which is the communication surface, and the surface 3, which is the surface opposed to the surface 2, is small. In such a case, the distance L5 is not greater than the wireless communication-capable distance. In this case, there is no problem if a shield member 201 is disposed, as shown in FIG. 5, in order to prevent the wireless signal from the antenna 171 from being transmitted to the outside via the surface 3. This shield member 201 may be disposed, for example, between the antenna 171 and the surface 3.

Figure 6:
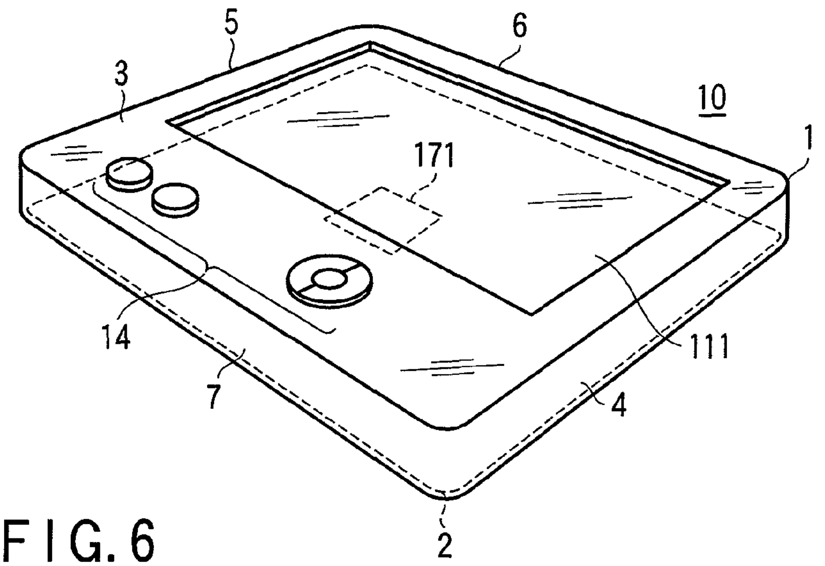
FIG. 6 is an exemplary perspective view which shows the external appearance of a device which is composed of the portable electronic apparatus according to the embodiment.

FIG. 6 shows an example of realization of the portable electronic apparatus 10 according to the present embodiment.

The portable electronic apparatus 10 of FIG. 6 is a portable computer. The housing 1 of this portable computer 1 has a thin box-shaped case. The surface 3 functions as the top surface of the housing 1, and the surface 2 functions as the bottom surface of the housing 1. The display screen of the LCD 111 is disposed on the top surface 3. In addition, buttons functioning as the input module 14 are disposed on the top surface 3.

The antenna 171 is provided in the housing 1 so as to be opposed to the bottom surface 2, and the antenna 171 outputs a wireless signal to the outside via the bottom surface 2. In short, the bottom surface 2 functions as the communication surface.

Figure 7:
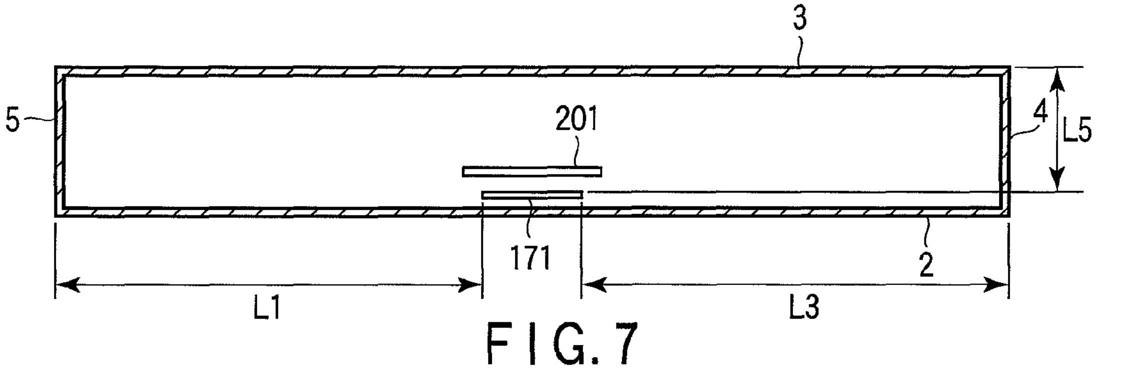
FIG. 7 is an exemplary cross-sectional view of the device shown in FIG. 6.
Figure 8:
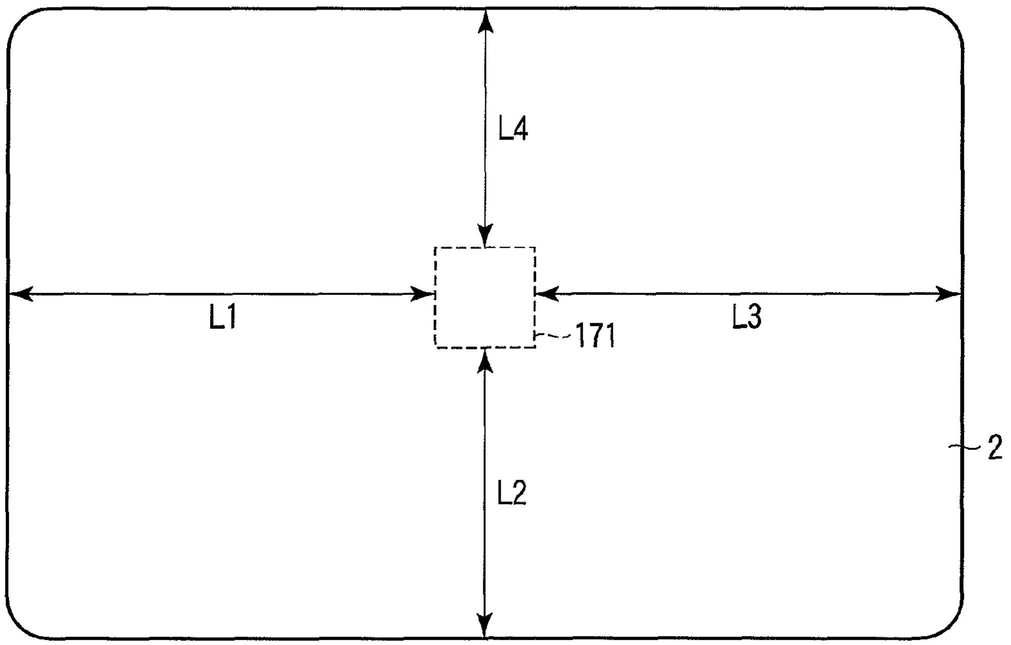
FIG. 8 is an exemplary bottom view of the device shown in FIG. 6.

FIG. 7 is a cross-sectional view of the housing 1, as viewed from the front surface 7 side of the housing 1 shown in FIG. 6. FIG. 8 is a bottom view of the housing 1 shown in FIG. 6.

As is understood from FIG. 7 and FIG. 8, the antenna 171 is provided on an inner side of the bottom surface 2 with a space, which is greater than the wireless communication-capable distance (3 cm), being provided from the outer peripheral edges of the bottom surface 2. The antenna 171 is spaced apart, by a distance greater than 3 cm, from each of the four ends of the bottom surface 2. Each of distances L1, L2, L3 and L4 is greater than 3 cm. The antenna 171 may be provided, for example, at a position corresponding to the central part of the bottom surface 2.

The distance L5 between the antenna 171 and the top surface 3 is not greater than 3 cm. Thus, a shield member 201 may be provided between the antenna 171 and the top surface 3.

Figure 9:
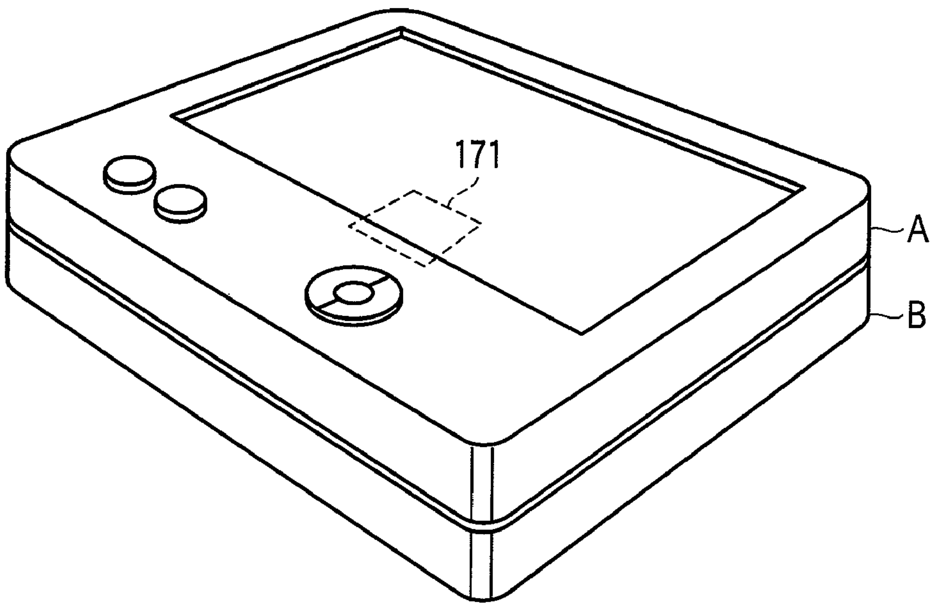
FIG. 9 is an exemplary view showing the state in which the communication surface of the device shown in FIG. 6 and the communication surface of another device are positioned in close proximity.

FIG. 9 shows the state in which the communication surfaces of two portable electronic apparatuses are positioned in close proximity.

Each of devices A and B in FIG. 9 has the same structure as the portable electronic apparatus 10 of FIG. 6. Close proximity wireless transfer between the device A and device B is executed in the state in which the bottom surface 2 of the device A and the bottom surface 2 of the device B are positioned in close proximity, as shown in FIG. 9. Specifically, the close proximity wireless transfer between the device A and device B is executed in the state in which the bottom surface of the device A is placed on the bottom surface 2 of the device B such that the antenna 171 of the device A is positioned in close proximity to the antenna 171 of the device B. In each of the device A and device B, the antenna 171 is disposed at an adequately remote position from the end portions of the communication surface. Thus, during the period in which wireless communication is executed between the device A and device B, a wireless signal of the wireless communication never reaches a device other than the devices A and B.

Figure 10:
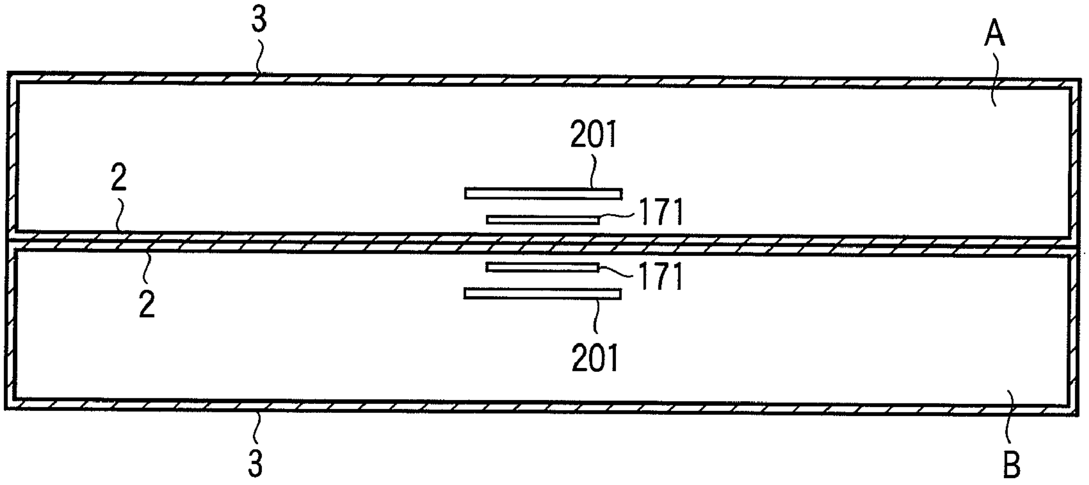
FIG. 10 is an exemplary cross-sectional view of the device shown in FIG. 6 and another device, which are in a close proximity state.

FIG. 10 is a cross-sectional view of the devices A and B which are positioned in close proximity. In the close proximity state, the antenna 171 of the device A and the antenna 171 of the device B are coupled by an induction electric field. Thereby, wireless connection is established between the close proximity wireless transfer device 171 of the device A and the close proximity wireless transfer device 171 of the device B.

FIG. 9 assumes the case in which the bottom surfaces of the devices A and B have the same size, and the antenna of each of the devices A and B is disposed at the central part of the bottom surface. In addition, exemplification is made of the case in which the bottom surfaces of the devices A and B are positioned in close proximity. As described above, the communication surfaces (bottom surfaces) of the devices A and B may not necessarily have the same size. Since it should suffice if the antenna 171 is disposed with a distance greater than 3 cm being provided from the end portion of the communication surface, the antenna 171 may be disposed at a position that is biased to an end side from the center of the communication surface.

Besides, an adapter having a top surface functioning as a communication surface may be positioned in close proximity to the portable electronic apparatus 10 shown in FIG. 6. In this case, as regards this adapter, the antenna 171 may be provided on an inner side of the top surface, with a space greater than the wireless communication-capable distance being provided from the outer edge of the top surface.

As has been described above, according to the present embodiment, the antenna is provided on an inner side of the communication surface, with a space greater than the wireless communication-capable distance being provided from the outer edge of the communication surface. Therefore, it is possible to prevent a wireless signal, which is being communicated with the external device, from leaking to the outside. Thus, the user can securely transfer a data file, etc., only by performing such a simple operation as positioning the devices in close proximity such that their antennas are positioned in close proximity.

The shape of the communication surface is not limited to a rectangle, and may be any one of a polygon, a circle, an ellipse, etc.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A portable electronic apparatus comprising:

a housing comprising a first surface;

an antenna in the housing opposite to the first surface configured to transmit a wireless signal via the first surface; and a close proximity wireless transfer device in the housing configured to execute close proximity wireless transfer with an external device within a first predetermined distance from the antenna via the first surface, wherein the antenna is on an inner side in the first surface with a distance from an outer peripheral edge of the first surface greater than the first predetermined distance which is a wireless communication-capable distance.

2. The portable electronic apparatus of claim 1, wherein the housing comprises a second surface opposite to the first surface with a second predetermined distance, a distance between the antenna and the second surface is equal to or less than the first predetermined distance, and the portable electronic apparatus further comprises a shield configured to prevent the wireless signal from being emitted via the second surface.

3. The portable electronic apparatus of claim 2, wherein the shield is located between the antenna and the second surface.

4. The portable electronic apparatus of claim 1, wherein the housing comprises a second surface opposite to the first surface, with a second predetermined distance, and a distance between the antenna and the second surface is greater than the first predetermined distance.

5. The portable electronic apparatus of claim 1, wherein the close proximity wireless transfer device is configured to transmit data comprising a plain-text to the external device.

6. A portable electronic apparatus comprising:

a housing comprising a top surface, a display screen on the top surface, and a bottom surface;

an antenna in the housing opposite to the bottom surface configured to transmit a wireless signal via the bottom surface; and a close proximity wireless transfer device in the housing configured to execute close proximity wireless transfer with an external device within a first predetermined distance from the antenna via the bottom surface, wherein the antenna is on an inner side of the bottom surface, with a distance from an outer peripheral edge of the bottom surface greater than the first predetermined distance which is a wireless communication-capable distance.

7. The portable electronic apparatus of claim 6, wherein a distance between the antenna and the top surface is equal to or less than the first predetermined distance, and the portable electronic apparatus further comprises a shield configured to prevent the wireless signal from being emitted via the top surface.

8. A communication control method for controlling close proximity wireless transfer between a first portable electronic apparatus and a second portable electronic apparatus, the first portable electronic apparatus comprising a first housing comprising a first surface, a first close proximity wireless transfer device in the first housing, and a first antenna on an inner side in the first surface with a distance from an outer peripheral edge of the first surface greater than a first predetermined distance which is a wireless communication-capable distance, and the second portable electronic apparatus comprising a second housing comprising a second surface, a second close proximity wireless transfer device in the second housing, and a second antenna on an inner side in the second surface, with a distance from an outer peripheral edge of the second surface greater than the first predetermined distance of the second close proximity wireless transfer device, the method comprising;

transmitting a connection request signal from one of the first close proximity wireless transfer device and the second portable electronic apparatus to the other of the first close proximity wireless transfer device and the second portable electronic apparatus, when the first surface of the first portable electronic apparatus and the second surface of the second portable electronic apparatus are in close proximity;

receiving the connection request signal is at the other of the first close proximity wireless transfer device and the second portable electronic apparatus; and establishing connection between the first close proximity wireless transfer device and the second close proximity wireless transfer device when the connection request signal is received.

* * * * *